Patented Sept. 18, 1951

2,567,988

UNITED STATES PATENT OFFICE 2,567,988

LATEX FOAMED WITH HYDROGEN PEROXIDE AND A POLYAMINE

Eugene J. Bethe, Mishawaka, Ind., assignor to United States Rubber Company, New York, N. Y., a corporation of New Jersey No Drawing. Application June 30, 1949, Serial No. 102,440

16 Claims. (Cl. 260—2.5)

This invention relates to the manufacture of sponge rubber from latex foam, and more particularly from latex foam produced by the liberation of gas from the decomposition of hydrogen peroxide incorporated in the latex.

The foaming of natural or synthetic rubber latex by adding hydrogen peroxide to the latex and evolving oxygen in the latex by decomposition of the hydrogen peroxide is known. The rate at which oxygen is evolved from hydrogen peroxide itself is too slow to produce a satisfactory foam unless a decomposition catalyst is used. Decomposition catalysts, such as catalase, or manganese dioxide or iron salts, have been suggested. Other decomposition catalysts from hydrogen peroxide, such as nickel, manganese and copper salts are known. The use of these catalysts in the decomposition of hydrogen peroxide to foam latex for the preparation of sponge rubber is accompanied by various disadvantages; for example, catalase is very expensive, and such metal oxides and salts, may impart undesirable properties to the final rubber product.

I have found that the combination of hydrogen peroxide and certain polyamines may be used to evolve a gas in latex which will successfully foam the latex. The polyamines which I have found operable according to the present invention are ethylene diamine, 1,2-propylene diamine, 1,3-diaminopropane, 1,3-diaminobutane, diethylene triamine, triethylene tetramine, tetraethylene pentamine, triethyl trimethylene triamine, 2-aminoethyl ethanolamine, and mixtures of the same. Monamines, such as monomethylamine, monoethylamine, diethylamine, triethylamine, diethanolamine, triethanolamine, and other polyamines than the above, such as hexamethylene diamine, hexamethylene tetramine, urea, 4,4'-diaminodiphenyl methane, piperazine are not satisfactory for evolving gas with the hydrogen peroxide in the rubber latex to foam the same. The amounts of hydrogen peroxide and selected polyamine, as above, to foam the latex are not critical. Generally, the hydrogen peroxide ($H_2O_2$) will be 1 to 10 parts by weight per 100 parts by weight of solids of the latex to be foamed, and the polyamine will be 2 to 50% by weight based on the hydrogen peroxide ($H_2O_2$) used.

The latex for preparing sponge rubber according to the present invention may be a natural rubber latex, or a conjugated diene polymer synthetic rubber latex, or mixtures of any of the same. Such conjugated diene polymer synthetic rubber latex may be an aqueous emulsion polymerizate of one or a mixture of butadienes-1,3 for example, butadiene - 1,3, 2-methyl-butadiene-1,3 (isoprene), 2-chloro-butadiene-1,3 (chloroprene), piperylene, 2,3-dimethyl butadiene-1,3. The conjugated diene polymer synthetic rubber latex, as known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

In making sponge rubber from such natural or synthetic rubber latex, the latex is compounded with the usual vulcanizing and compounding ingredients. These materials are added in the conventional manner as aqueous solutions or pastes. Just prior to the time the latex is to be foamed, the hydrogen peroxide ($H_2O_2$) in the form of an aqueous solution, generally 30 to 35% strength, is added and mixed thoroughly into the latex. The polyamine may be added to the latex before, at the same time, or after the hydrogen peroxide. The compounded latex is then poured into a mold, whereupon it expands to completely fill the mold cavity. The density of the sponge rubber products made in this manner may be controlled accurately by controlling the quantity of latex introduced into the mold. The less latex used, of course, the lighter the density of the resulting foam and of the finished sponge after gelling, vulcanizing and drying. After the latex has been foamed and expanded to fill out the mold, the latex is permitted to gel. Gelling may be effected following any of the well known techniques. The latex may be compounded just prior to pouring with a delayed action gelling agent, such as alkali-metal silicofluoride, and after the foaming permitting sufficient time to lapse to bring about gelation, or speeding up such gelation by raising the temperature. The latex may also be compounded with a heat-sensitive material, such as starch, whereupon the latex foam in the mold gels on raising the foam to an elevated temperature.

As known, the latex foam may also be gelled or coagulated by freezing, or the latex foam may be frozen without coagulation followed by coagulation on passing a coagulating gas, such as carbon dioxide, through the foam in the mold. Following such gelation or setting of the foam in the mold, the expanded latex is vulcanized by placing the mold in steam or hot water or hot air to complete vulcanization, after which the wet sponge is removed from the mold, washed, if desired, and dried. If desired, the latex may be foamed in bulk and the foam poured in molds before being gelled. The density of such foam may be regulated by the amount of hydrogen peroxide added. The method of the present invention may also be used to form cellular resins from synthetic resin latices, such as aqueous emulsion polymerizates of vinyl compounds, such as vinyl chloride, styrene, mixtures of styrene and acrylonitrile, and mixtures of monovinyl compounds with less than 30% of a conjugated diene, such as butadiene.

The following examples, in which all parts are referred to by weight, illustrate the invention.

Example I

A natural Hevea rubber latex of 68% solids concentration was compounded according to the following formulation, the compounding ingredients being added as solutions or aqueous pastes in the conventional manner:

| Ingredients | Weight of Ingredients per se. | Wet Weight of Ingredients (Aqueous Solution or Paste) |
|---|---|---|
| Rubber (in natural rubber latex) | 100.0 | 147 |
| Potassium Hydroxide | .4 | 4 |
| Potassium Oleate | 2.0 | 10 |
| Zinc Oxide | 5.0 | 11 |
| Zinc Salt of 2-mercaptobenzothiazole | 1.3 | 4 |
| Zinc Diethyl Dithiocarbamate | 1.4 | 3 |
| Sulfur | 2.5 | 4 |
| Methyl Cellulose | .5 | 10 |
| Tetraethylenepentamine | 1.22 | 5 |
| Hydrogen Peroxide | 5.3 | 15.2 |

The ingredients were mixed into the latex in the order listed, the hydrogen peroxide being added after the other ingredients had been mixed in. The zinc salt of mercaptobenzothiazole and zinc diethyl dithiocarbamate are accelerators. The methyl cellulose is a thickening agent. On addition of the hydrogen peroxide, the mixing was continued for about ½ minute to distribute uniformly throughout the body of the latex compound. The thus finally compounded latex was then poured into a mold having a cover or top plate with the usual cylindrical coring elements for making cored mattresses and the like, projecting therefrom. The mold was equipped with a gasket between the top plate and bottom pan or body of the mold. The mold had closable vent holes in the top plate to permit air to escape from the cavity as the latex expanded. Within four minutes the latex expanded to completely fill the mold. The vent holes were closed and the mold was clamped tightly together against the sealing gasket. The mold was then immersed in an alcohol Dry-Ice bath at −70° F. overnight to freeze and coagulate the latex foam. The mold was then placed in an open steam vulcanizer at 250° F. for 39 minutes to vulcanize the sponge. The cellular structure of the molded sponge was very uniform and the external skin smooth.

Example II

In this case the sponge was prepared from 62% solids GR–S latex (copolymer of 75% butadiene and 25% styrene). Also, a different polyamine was used from that illustrated in Example I, and sodium silicofluoride was used as the gelling agent. The synthetic rubber latex was compounded according to the following formulation:

| Ingredients | Weight of Ingredients per se. | Wet Weight of Ingredients (Aqueous Solution or Paste) |
|---|---|---|
| Synthetic Rubber (in GR-S Latex) | 100.0 | 161 |
| Sulfur | 3.5 | 6 |
| Accelerator | 1.35 | 4 |
| Antioxidant | 1.0 | 2 |
| Zinc Oxide | 4.2 | 7 |
| Potassium Oleate | 1.5 | 7 |
| Triethyl Trimethylene Triamine | .5 | 2 |
| Hydrogen Peroxide | 5.3 | 15.2 |
| Sodium Silicofluoride | 1.4 | 5 |

The ingredients were mixed into the latex in the order listed, the hydrogen peroxide and the sodium silicofluoride being added just prior to pouring the latex into the mold. In that the sodium silicofluoride begins to hydrolyze when added to the latex and causes gelation within 5 to 10 minutes, the latex should all be in the mold and blown prior to gelation. After the latex had expanded and gelled, it was vulcanized in the mold for 25 minutes at 215° F. in open steam. The molded sponge had a good uniform structure.

Example III

The polyamine used in this example was 2-aminoethyl ethanolamine having the structure $NH_2—CH_2—CH_2—NH—CH_2CH_2—OH$.

100 parts dry weight of a 61% solids concentration GR–S synthetic rubber latex (a copolymer of 75% butadiene-1,3 and 25% styrene) was matured for 48 hours at 120° F. with one part of sulfur and one part of accelerator. The matured latex was compounded according to the following formulation:

| Ingredients | Weight of Ingredients per se. | Wet Weight of Ingredients (Aqueous Solution or Paste) |
|---|---|---|
| GR-S Rubber (in matured GR-S latex) | 100 | 164 |
| Sulfur (in matured GR-S latex) | 1 | 2 |
| Accelerator (in matured GR-S latex) | 1.3 | 3 |
| Potassium Soap | 2.5 | 9 |
| Sulfur | 2.5 | 4 |
| Antioxidant | 1 | 2 |
| Zinc Oxide | 4 | 9 |
| Methyl Cellulose | 0.6 | 19 |
| Hydrogen Peroxide | 4.6 | 13 |
| 2-Aminoethyl Ethanolamine | 1.6 | 3 |

The ingredients were mixed into the latex in the order listed. The hydrogen peroxide was added just before pouring in the mold, followed by the addition of the 2-aminoethyl ethanolamine. When the mold had filled with the foam, it was sealed and the foam was frozen in the mold for 15 minutes at −45° F. Carbon dioxide was then gassed through the mold for 4 minutes to complete coagulation of the rubber in the foam. The sponge was cured for 20 minutes in an open steam vulcanizer at 227° F. The foam structure was very uniform.

In view of the many changes and modifications that may be made without departing from the principles underlying the invention, reference should be made to the appended claims for an understanding of the scope of the invention.

Having thus described my invention, what I claim and desire to protect by Letters Patent is:

1. In the manufacture of sponge rubber from a latex foam, the step of foaming a rubber latex selected from the group consisting of natural rubber latex and conjugated diene polymer synthetic rubber latices by incorporating in said latex 1 to 10 parts by weight of hydrogen peroxide per 100 parts of solids of said latex, and 2 to 50% by weight based on the hydrogen peroxide of polyamine selected from the group consisting of ethylene diamine, 1,2-propylene diamine, diethylene triamine, triethylene tetramine, tetraethylene pentamine, triethyl trimethylene triamine, 2-aminoethyl ethanolamine, and mixtures of the same.

2. The method of claim 1 in which the latex is natural rubber latex.

3. The method of claim 1 in which the latex is conjugated diene polymer synthetic rubber latex.

4. The method of claim 1 in which the latex is an aqueous emulsion polymerizate of a mixture of butadiene and styrene.

5. The method of claim 1 in which the polyamine is tetraethylene pentamine.

6. The method of claim 1 in which the polyamine is triethyl trimethylene triamine.

7. The method of claim 1 in which the polyamine is 2-aminoethyl ethanolamine.

8. The method of claim 1 in which the latex is natural rubber latex and the polyamine is triethyl trimethylene polyamine.

9. In the manufacture of sponge rubber from a latex foam, the step of foaming a rubber latex selected from the group consisting of natural rubber latex and conjugated diene polymer synthetic rubber latices by incorporating in said latex 1 to 10 parts by weight of hydrogen peroxide per 100 parts of solids of said latex, and as the sole hydrogen peroxide decomposition catalyst 2 to 50% by weight based on the hydrogen peroxide of polyamine selected from the group consisting of ethylene diamine, 1,2-propylene diamine, diethylene triamine, triethylene tetramine, tetraethylene pentamine, triethyl trimethylene triamine, 2-amino-ethyl ethanolamine, and mixtures of the same.

10. The method of claim 9 in which the latex is natural rubber latex.

11. The method of claim 9 in which the latex is conjugated diene polymer synthetic rubber latex.

12. The method of claim 9 in which the latex is an aqueous emulsion polymerizate of a mixture of butadiene and styrene.

13. The method of claim 9 in which the polyamine is tetraethylene pentamine.

14. The method of claim 9 in which the polyamine is triethyl trimethylene triamine.

15. The method of claim 9 in which the polyamine is 2-aminoethyl ethanolamine.

16. The method of claim 9 in which the latex is natural rubber latex and the polyamine is triethyl trimethylene polyamine.

EUGENE J. BETHE.

REFERENCES CITED

The following references are of record in the file of this patent:

UNITED STATES PATENTS

| Number | Name | Date |
|---|---|---|
| 2,138,081 | Wolf | Nov. 29, 1938 |
| 2,476,827 | Wohler et al. | July 19, 1949 |
| 2,484,434 | Van Buskirk et al. | Oct. 11, 1949 |

OTHER REFERENCES

Pierron, Comptes Rendu 222, pp. 1107–9 (1946).